J. L. CREVELING.
ELECTRIC REGULATION.
APPLICATION FILED NOV. 1, 1916.

1,344,222.

Patented June 22, 1920.

Inventor;
John L. Creveling

UNITED STATES PATENT OFFICE.

JOHN L. CREVELING, OF WHITE PLAINS, NEW YORK, ASSIGNOR TO GOULD COUPLER COMPANY, A CORPORATION OF NEW YORK.

ELECTRIC REGULATION.

1,344,222. Specification of Letters Patent. Patented June 22, 1920.

Application filed November 1, 1916. Serial No. 128,826.

*To all whom it may concern:*

Be it known that I, JOHN L. CREVELING, a citizen of the United States, residing in White Plains, county of Westchester, and State of New York, have invented certain new and useful Improvements in Electric Regulation, of which the following is a description.

My invention pertains to that class of electric regulation wherein it is desired to automatically regulate a generator, and has for a particular object to provide means whereby the same will be efficiently accomplished.

My invention is particularly applicable to systems wherein a dynamo or generator is used to charge a storage battery and operate lamps or other translating devices and wherein it is desired to limit the current in a circuit supplied by the generator, or the voltage across a circuit supplied by the generator throughout wide changes in speed, and it will therefore be described with reference to such a system.

Figure 1:
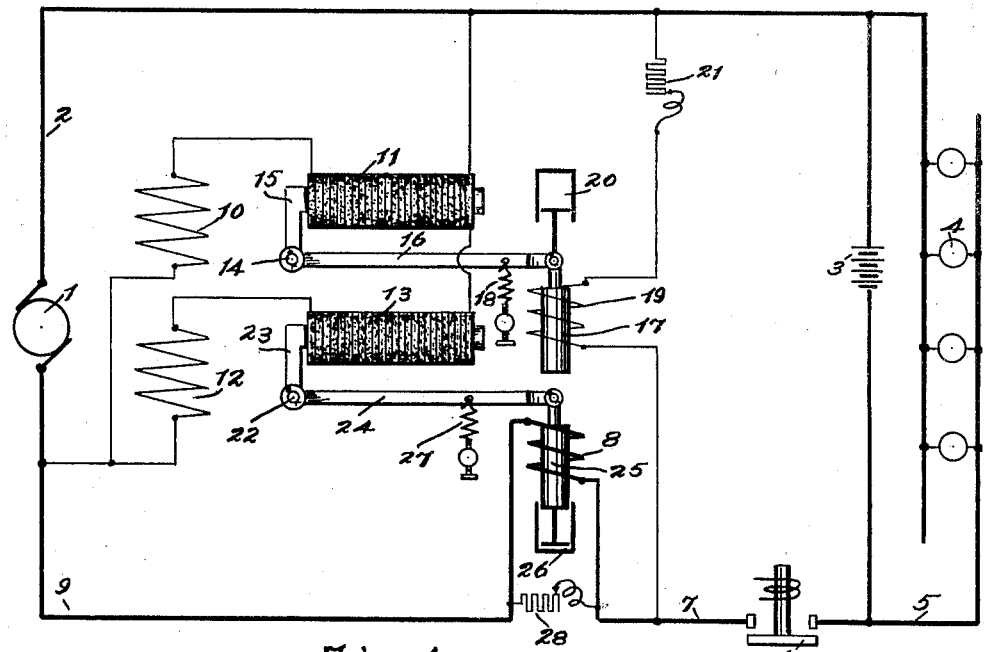
Figure 2:
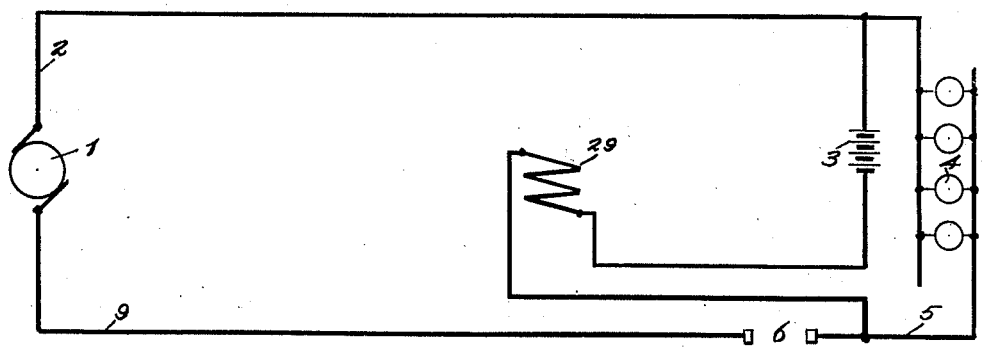

Figure 1 is a diagrammatic representation of such a system illustrating one embodiment of my invention; and Fig. 2 is a diagrammatic representation illustrating a modification which may be made in the system of Fig. 1.

In the drawing, 1 represents a dynamo or generator having the positive lead 2 in communication with the positive terminals of the storage battery 3 and lamps or other translating devices 4. The storage battery and translating devices have their negative terminals connected by lead 5 with one side of a suitable switch 6, the opposite side of which is connected as by lead 7 with one end of the solenoid or winding 8, the opposite end of which is connected as by wire 9 with the negative side of the generator 1. The generator is provided with a field coil 10, indicated as a shunt coil, having in series therewith a controllable resistance 11, indicated as of the carbon pile variety for the purpose of illustration. The generator is also provided with a shunt field coil 12 having in series therewith a controllable resistance 13, also indicated for example as of the carbon pile type. It will therefore be obvious that manipulation of the pressure upon the carbon piles 11 and 13, by varying the resistance thereof, will affect the field of the generator. The stud or pivot 14 carries a bell-crank lever composed of the short arm 15 and the long arm 16. The free extremity of the arm 16 has pivotally connected therewith a core of iron or other magnetic material indicated at 17, and is normally drawn in a downward direction as by the spring 18 which tends to increase the pressure upon the pile 11. 19 is a coil across the circuit whose voltage it is desired to prevent from exceeding a predetermined limit, and in this instance is indicated as across the generator circuit and therefore responsive to fluctuations in generator voltage. When energized the coil 19 tends to lift the core 17 and decrease the pressure upon the pile 11 and increase the resistance thereof, while too sudden movement is prevented by the dash-pot mechanism indicated at 20. 21 is a variable resistance which may be used for adjusting the operation of coil 19. 22 is a pivot or stud carrying the bell-crank lever comprising the short arm 23 and the long arm 24, said arm 24 carrying at its free extremity a core of iron or other magnetic material indicated at 25, which is pivotally united to the said arm and surrounded by the coil 8 in such manner that the said coil when energized tends to raise the core 25 against the action of the dash-pot arrangement 26 and decrease the pressure upon the pile 13 and increase the resistance thereof. 27 is an adjustable spring normally tending to draw the lever 24 downwardly and increase the pressure upon the pile 13. 28 is an adjustable resistance in shunt across the coil 8 whereby the operation of the said coil may be adjusted In Fig. 2 like numerals are used to indicate like parts, and the only modification intended to be brought out by this figure resides in the coil 29 which is in series with the storage battery and which may be substituted in place of the coil 8 of Fig. 1 which is in series with the generator.

The switch 6 may be of any suitable type, and I prefer to use one of the usual automatic switches which will close its circuit when the voltage of the generator is substantially equal to that of the storage battery and open the circuit when the generator voltage falls very slightly below that of the battery, in such manner as to prevent back discharge from the battery through the generator. As these switches are well known in the art, and the particular type used forms no part of my present invention, details are purposely omitted for the sake of brevity.

An operation of my invention is substantially as follows:

If the generator be at rest or running at too low speed, switch 6 will be open and the translating devices may be supplied by the storage battery 3 in a well known manner. If the generator have its voltage brought to slightly in excess of that of the storage battery, switch 6 will close and current will flow from the generator through lead 2 to the storage battery 3 and lamps or other translating devices 4, from which return is made through wire 5, switch 6, lead 7, coil 8 and lead 9 to the generator. A portion of the current, if desired, may, of course, be diverted from coil 8 by means of the adjustable shunt 28. And I so adjust shunt 28 and spring 27 that when the maximum desired current is reached in the coil 8, any further tendency to increase, as for example upon increases in speed of the generator, will cause coil 8 to lift the core 25 smoothly against the action of dashpot 26 and spring 27, so as to lessen the pressure upon the pile 13 and increase the resistance thereof to cut down the field current in the coil 12 and thereby hold this maximum desired current from being exceeded. If the current fall below the normal, the reverse operation will take place, tending to restore the same to the normal value.

I so adjust the resistance 21 and the spring 18 that in case the voltage across the circuit measured by the coil 19 tends to increase above the predetermined desired limit, the said coil will raise core 17 evenly against the action of dashpot 20 and spring 18, in such manner as to raise lever 16 and increase the resistance of the pile 11 and cut down the excitation of coil 10 and prevent this desired maximum voltage from being exceeded. If the maximum voltage thus held upon the system tend to deliver too great a current, the current regulator will decrease the voltage of the generator and tend to hold the maximum current from being exceeded, by lowering the voltage upon the generator, which in turn will tend to cause the voltage regulator to increase the pressure upon the pile 11 and gradually withdraw from the function of regulation. Then if this current be maintained until the voltage of the battery shall rise, as for example when nearing a fully charged state, the voltage regulator will again come into play, and by tending to hold the voltage constant will hold it at a point insufficient to deliver the maximum current which will then fall off as the battery voltage rises, and the current regulator will go out of action and shift the burden upon the voltage regulator. And it will be noted that while one regulator is operative and dissipating energy in the form of heat, the other regulator reduces its resistance to a minimum and its coil is, in effect, across the mains, and very little loss takes place in the regulating apparatus. And the other regulator, which has a regulating resistance in operation, only has to handle a portion of the field current, and therefore causes only a portion of the loss in heat that would take place if the regulator were controlling the generator by varying the resistance in the entire field, as when a single field coil is used. If the maximum speed at which the generator is to run requires, roughly, what might be called half field excitation, then I prefer to make my field coils substantially equal and alike. Then at maximum speed one coil is practically cut out and the other coil practically operating with no wasteful resistance. If, however, the speed of the generator is liable to vary so widely that at times it requires much less than half of the normal field strength to hold the generator from too greatly exceeding the predetermined chosen limits, I prefer in practice to employ either of two arrangements, depending upon whether or not storage batteries or other counter-electromotive forces of low resistance constitute a portion of the load and are to be considered. That is, with the system as shown in Fig. 1, employing the storage battery and a generator liable to attain a very high speed, I make the coil 12 controlled by the current regulator sufficiently powerful, and the coil 10 sufficiently weak, that the current regulator may always be able to hold the generator from exceeding a predetermined current by controlling its respective field coil, inasmuch as small fluctuations in voltage are apt to cause great increases in current owing to the low internal resistance of the battery. On the other hand, if there be no battery in circuit and the load consists of lamps or other translating devices, in effect the equivalent of an ohmic resistance, then I make the coil 10 the principal coil capable of handling the generator for any speed variation to be met. For with this load there will be no great alterations in current unless from mere over-load, which may be compensated for by the weaker field coil. However, with any arrangement chosen, if either the voltage or current responsive means is not capable of sufficiently reducing the field to perform the entire function of regulation, the one which is operating at its maximum will be assisted by the other, provided the quantity measured by it exceeds its respective limit.

The operation of the modification intended to be brought out by the diagram in Fig. 2 is substantially the same as that outlined above, with the exception that it is the current in the battery circuit that is limited by the current responsive means, instead of the total generator current as is the case in Fig. 1.

I do not wish in any way to limit myself to any of the exact constructions or details of operation given above to illustrate one embodiment of my invention, for it will be obvious that wide departure may be made without departing from the spirit and scope thereof which is set forth in the following claims.

What I claim is:

1. The combination with a generator having a plurality of field exciting means, of automatic means for regulating a plurality of factors of the output of said generator comprehending means for affecting certain of said exciting means to control one factor of the output and other of the exciting means to control another factor of the output.

2. The combination with a generator having a plurality of field energizing means, of a plurality of regulating means for independently affecting the field energizing means and responding to different electrical characteristics of the output of the generator.

3. The combination with a generator provided with a plurality of field exciting means, of a plurality of regulators affecting a plurality of said means and each independently responsive to a different one of a plurality of electrical characteristics of said generator.

4. The combination with a generator provided with a plurality of field exciting means, of a regulator for affecting one of said exciting means responsive to voltage fluctuations, and a regulator for affecting another of said field exciting means responsive to current fluctuations.

5. The combination with a generator provided with a plurality of field exciting means and a storage battery charged thereby, of a regulator for affecting one of said exciting means responsive to voltage fluctuations, and a regulator for affecting another of said field exciting means responsive to current fluctuations during charging of the battery.

6. The combination with a generator having a plurality of field energizing coils, of means for controlling the energization of one of said coils in response to current fluctuations, and means for controlling the energization of another of said coils in response to voltage fluctuations.

7. The combination with a generator having a plurality of field energizing coils, of a regulator in series with one of said coils, voltage responsive means for operating said regulator, a regulator in series with another of said coils, and current responsive means for operating said last named regulator.

8. The combination with a generator having a plurality of field energizing coils and a storage battery charged thereby, of means for controlling the current in one of said energizing coils comprehending a voltage responsive regulator and means for controlling the current in another of said energizing coils comprehending a current responsive regulator whereby the current to the battery and the voltage impressed upon the same are held from exceeding predetermined limits.

9. The combination with a generator having a plurality of field energizing coils and a storage battery charged thereby, of means for controlling the current in one of said energizing coils comprehending a voltage responsive regulator tending to hold the voltage constant, and means for controlling the current in another of said energizing coils comprehending a current responsive regulator tending to hold the current constant whereby the current to the battery and the voltage impressed upon the same are held from exceeding predetermined limits.

10. The combination with a generator provided with a plurality of field exciting means, of electro-magnetic means for affecting certain of said exciting means in response to fluctuations in a certain factor of the generator's output, and affecting other of said exciting means in response to fluctuations in another factor of the generator's output.

11. The combination with a generator provided with a plurality of field exciting means, of electro-magnetic means for affecting certain of said exciting means in response to fluctuations in a certain factor of the generator's output, and electro-magnetic means affecting other of said exciting means in response to fluctuations in another factor of the generator's output.

12. The combination with a dynamo provided with an armature operated at varying speed and a plurality of means tending to provide a magnetic field for said armature, and a storage battery charged by said dynamo and varying in electromotive force at different stages of charging, of automatic means for controlling the current supplied to said battery responsive to current fluctuations and affecting certain of the field providing means, and means for limiting the voltage impressed upon the battery responding to fluctuations in voltage across the generator and battery and affecting certain other of the field providing means.

JOHN L. CREVELING.